US011113719B2

(12) United States Patent
Weldemariam et al.

(10) Patent No.: US 11,113,719 B2
(45) Date of Patent: Sep. 7, 2021

(54) CONTENT DEMOTION

(71) Applicant: International Business Machines Corporation, Armonk, NY (US)

(72) Inventors: Komminist Weldemariam, Nairobi (KE); Sushain Pandit, Austin, TX (US); Clifford A. Pickover, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 211 days.

(21) Appl. No.: 16/133,671

(22) Filed: Sep. 17, 2018

(65) Prior Publication Data

US 2020/0090210 A1  Mar. 19, 2020

(51) Int. Cl.
*G06Q 30/00* (2012.01)
*G06Q 30/02* (2012.01)
*G06N 3/08* (2006.01)

(52) U.S. Cl.
CPC ........... *G06Q 30/0244* (2013.01); *G06N 3/08* (2013.01)

(58) Field of Classification Search
None
See application file for complete search history.

(56) References Cited

U.S. PATENT DOCUMENTS

| 9,565,245 B1 | 2/2017 | Brown |
| 9,628,575 B1 | 4/2017 | Lewis |
| 10,713,686 B2 * | 7/2020 | Shiffert ............... G06Q 30/0261 |
| 10,990,996 B1 * | 4/2021 | Podgorny .......... G06Q 30/0218 |
| 2007/0060114 A1 | 3/2007 | Ramer |
| 2011/0082807 A1 | 4/2011 | Parekh |
| 2012/0079400 A1 | 3/2012 | Nauerz |
| 2013/0018714 A1 * | 1/2013 | George .............. G06Q 30/0277 705/14.16 |
| 2014/0032332 A1 | 1/2014 | Atli |
| 2015/0070516 A1 | 3/2015 | Shoemake et al. |
| 2015/0149289 A1 * | 5/2015 | St. Clair ............ G06Q 30/0264 705/14.61 |
| 2016/0203522 A1 * | 7/2016 | Shiffert ................ H04W 4/021 705/14.58 |
| 2017/0212664 A1 | 7/2017 | Ghadiyali et al. |
| 2017/0213296 A1 | 7/2017 | de Oliveira et al. |
| 2019/0095945 A1 * | 3/2019 | Fabbri ................ G06Q 30/0244 |
| 2019/0279253 A1 * | 9/2019 | Wai .................... G06Q 30/0269 |

OTHER PUBLICATIONS

Cloud Network, 2017, Akamai Technologies, printed through www.archive.org (Year: 2017).*
He et. al, Visual Bayesian Personalized Ranking from Implicit Feedback, 2016, Association for the Advancement of Artificial Intelligence (Year: 2016).*

(Continued)

*Primary Examiner* — Naresh Vig
(74) *Attorney, Agent, or Firm* — Shimon Benjamin; Otterstedt, Wallace & Kammer, LLP

(57) ABSTRACT

An apparatus, for example a primary device, implements a method that includes receiving promoted content for display at the primary device; predicting a user's behavior with respect to the promoted content by estimating the user's context and preferences, using a neural network; and in response to the prediction of the user's behavior, automatically demoting the promoted content.

14 Claims, 6 Drawing Sheets

(56) References Cited

OTHER PUBLICATIONS

Peter Mell et al., "The NIST Definition of Cloud Computing". Special Publication 800-145. NIST. Sep. 2011, pp. 1-7.
John E. Kelly III, "Computing, cognition, and the future of knowing", IBM Corp. Oct. 2015. pp. 1-7.
Tess Townsend, "Google is updating its search to demote fake news", Recode. Apr. 2017. available at https://www.recode.net/2017/4/25/15415428/google-updating-search-flagging-fake-news. pp. 1-5.

* cited by examiner

CONTENT DEMOTION

BACKGROUND

The present invention relates to the internet user experience (UX), and more specifically, to content promotion in social networks.

Presently, hundreds of recommendation systems analyze a user's interest(s) (e.g., from social network engagement) and tailor promotion of content items to a user or a group of users in a social networking system. For example, promoted content includes promoted ads, posts, tweets, sponsored articles, images, audio, advertisements for products, etc. Existing methods monitor a user's online actions, activities, or behaviors with respect to a content item in order to select content items to be promoted and possibly shared by the user on one or more social networks or devices.

Furthermore, currently, existing content item promotion algorithms are based on an "ad source centric" view of the world. For example, a typical algorithm takes into consideration—1) activity within the user's immediate social graph, 2) shared data and retail/purchase footprint, 3) activity within the user's extended graph and 4) location. This contextual information seems to be "good enough" for content promotion because promotion takes an ad source centric view (meaning the entity promoting the content is trying to benefit the agency who pays for display of ads).

Content promotion becomes complicated when a user has more than one computing device (e.g., laptop, mobile phone, smartwatch, smart TV), which can be shared by one or more secondary users. Consider for example: a user with one or more computing devices (mobile, tablet devices, laptops, or smartphone) with each device running one or more applications (e.g., Facebook, YouTube, e-commerce applications). These devices are often compatible with each other based on their underlying technologies (e.g., operating system, user applications, sensors deployed, etc.) such that the state of an application (and of the user) can be transferred from the first device to the other (secondary) devices, which can be used by one or more secondary users.

SUMMARY

Principles of the invention provide techniques for content demotion. In one aspect, an exemplary method includes receiving promoted content for display at a primary device that is a node of a cloud network; predicting a user's behavior with respect to the promoted content by estimating the user's context and preferences, using a neural network; and in response to the prediction of the user's behavior, automatically demoting the promoted content.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Temporarily demoting an enhanced content item for a user or group of users in one or more applications based on dynamically created user profile.

Predicting the behavior of a user toward a promoted content item based on characteristics of the promoted content item.

Dynamically controlling the transfer of promoted content items based on one or more secondary users on secondary devices.

Automatically controlling undesired content promotion by learning the user context and behavior from plurality of historical data, including historic user's activity within their immediate social graph, shared data and retail/purchase footprint, user's activity within their extended social graph, user's location, device-user interaction history, and so on.

Reducing unnecessary user interactions with content items (e.g., advertisements) thereby improving user effectiveness on prioritized user online activities.

Automatically controlling transfer of promoted content items along with the one or more states of applications and user state(s).

These and other features and advantages of the present invention will become apparent from the following detailed description of illustrative embodiments thereof, which is to be read in connection with the accompanying drawings.

DETAILED DESCRIPTION

Figure 1:
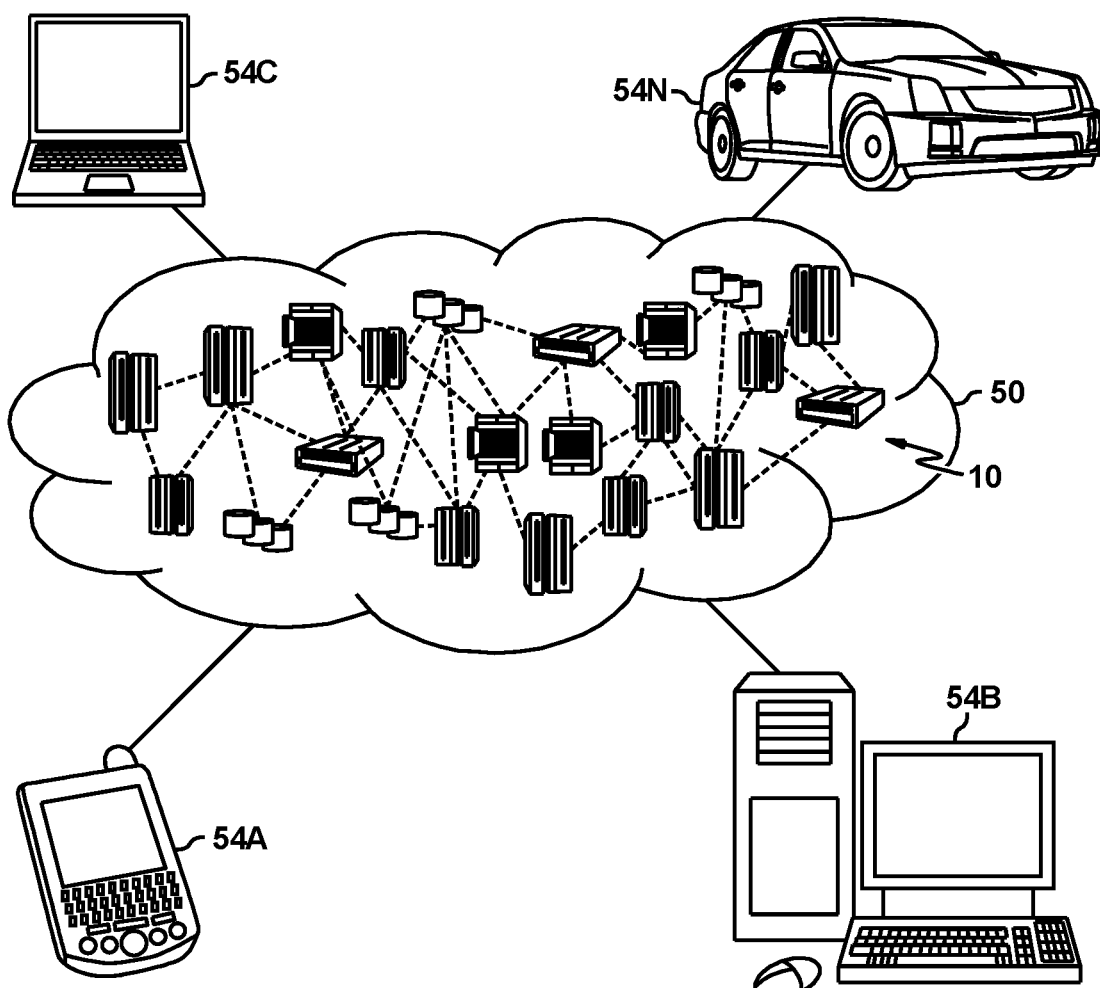
FIG. 1 depicts a cloud computing environment according to an embodiment of the present invention.

As noted, principles of the invention provide techniques for content demotion. Content demotion can include receiving a promoted content item (e.g., video, audio, or text) for a user(s) from one or more applications (e.g., social media, content sharing, e-commerce, e-mail); defining and quantifying context, preferences, and feedback from a user centric view; predicting the user(s) behavior with respect to the received promoted content item; determining content item demotion factors for the received promoted content item; and, based on the predicted user context, user behavior, and demotion factors, automatically demoting the content item.

Existing content promotion approaches predominantly ignore not only the context of a first device and a first user of the first device, but also the context of secondary users of secondary devices (e.g., a mobile phone shared by family members of different context and behavior such as adult vs secondary users (children), or one or more computing devices shared by co-workers with different backgrounds), while displaying a promoted content item that might be suitable for the first user of the first device but not for all of the other secondary users of the secondary devices. For example, currently there is no way to detect secondary users (e.g., children) who sometimes purchase a promoted content item without the corresponding primary users' knowledge and/or consent.

Thus, one or more embodiments advantageously provide an internet user experience with a "user centric view"— meaning to the benefit of the user or users who ultimately see the content. In one or more embodiments, a user centric view applies a different composition and application of "context" to address the problem of content demotion, i.e. obscuring or removing content that could be offensive or annoying to a user. Such a context could include a quantified notion of the user's direct or inferred cognitive state as well as implicit/explicit user feedback. In other words, one or more embodiments advantageously provide an intelligent system that can automatically demote content items partially or completely based on history, cohort, and cognitive considerations of the user.

Accordingly, one or more embodiments provide a method and system for receiving promoted content (e.g., video, audio, or text) for a user(s) from one or more applications (e.g., social media, content sharing application, e-commerce applications); defining and quantifying context, preferences, and feedback from a user centric view; predicting the behavior of the user(s) with respect to the promoted content; determining content item demotion factors for the promoted content; and, based on the predicted user context, user behavior, and demotion factors, automatically demoting the promoted content.

It will be appreciated that certain embodiments are implemented in the cloud, i.e. between an application server and a user's device. Other embodiments are implemented at the user's device.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
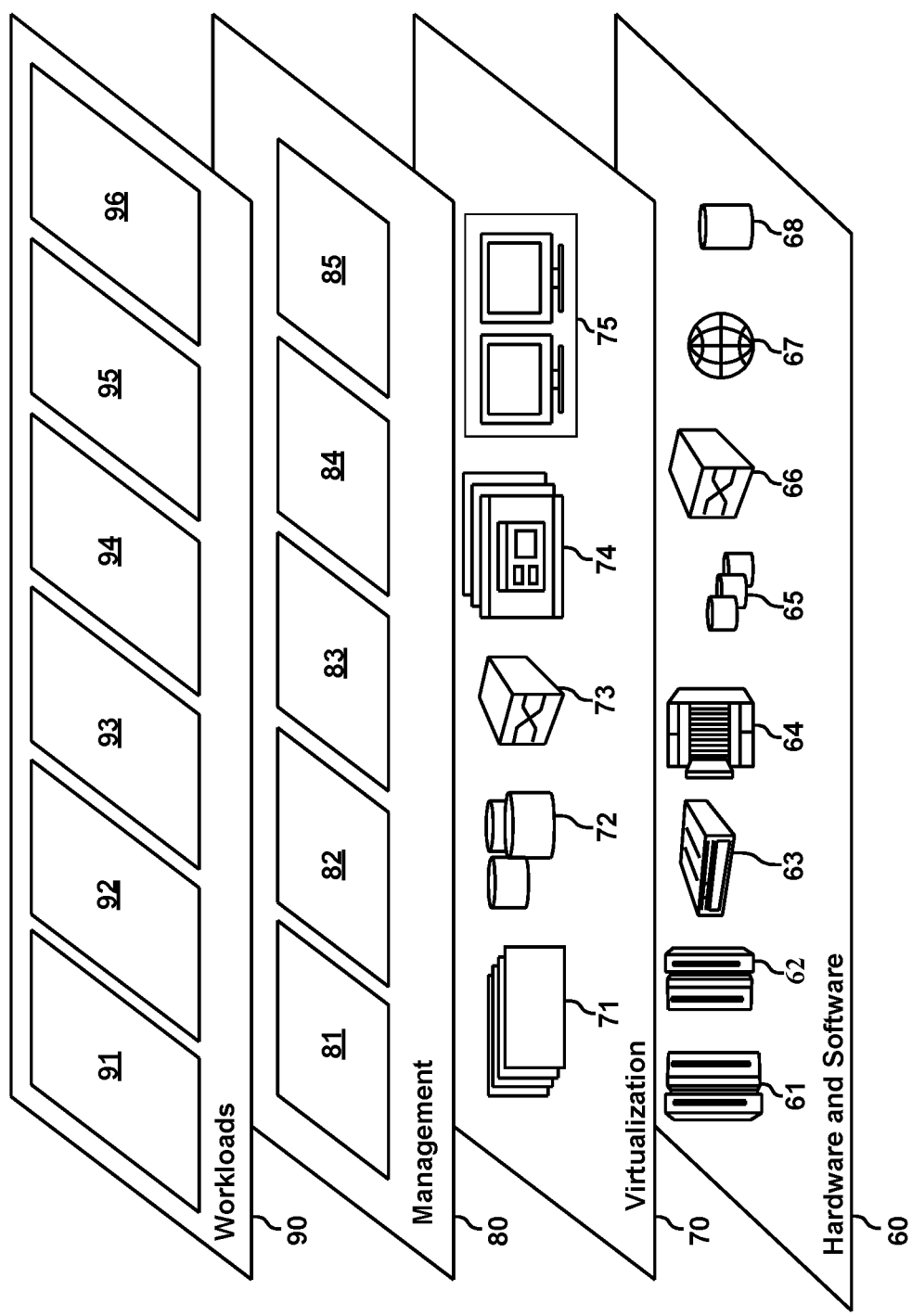
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a content management module 96.

Figure 3:
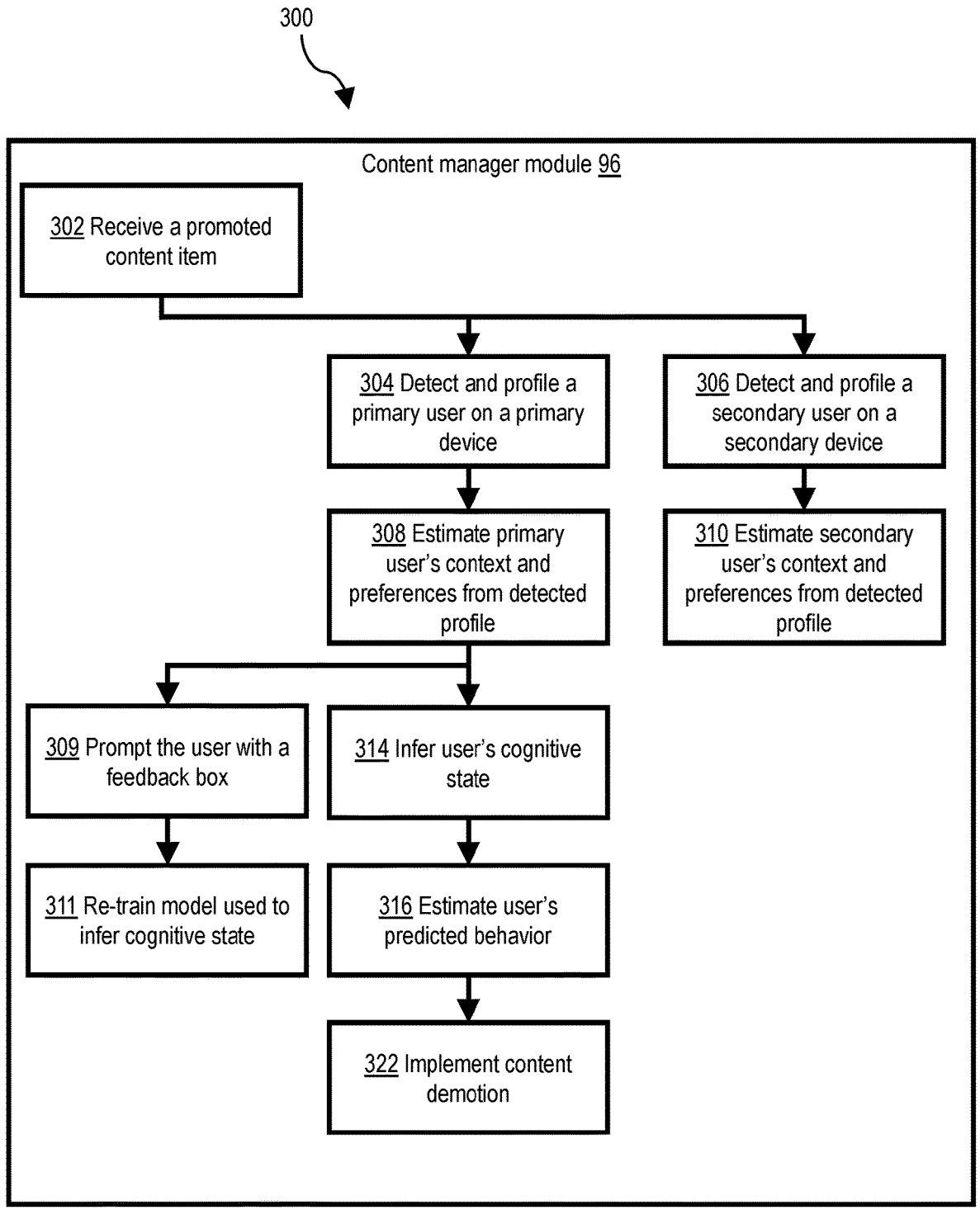
FIG. 3 depicts a method implemented by a content management module according to an exemplary embodiment.

In general, the content management module 96 implements a method for demoting promoted content. FIG. 3 depicts the method 300 for demoting promoted content. The method 300 includes, at 302, receiving a promoted content item. At 304, detect and profile a primary user on a primary device. At 306, detect and profile one or more secondary users on one or more secondary devices. In one or more embodiments, detecting and profiling includes monitoring user interactions with the device (using sensors such as eye tracking, motion tracking, audio/speech sensors, camera) and the user interaction with one or more applications (based on typing speed/sequence/pattern, mouse movement, the analysis of typed content such as a post of social media, application profile, etc.). In one or more embodiments, in steps 308 and 310, the content management module 96 further determines each user's context and preferences from the detected user's respective profile.

Figure 4:
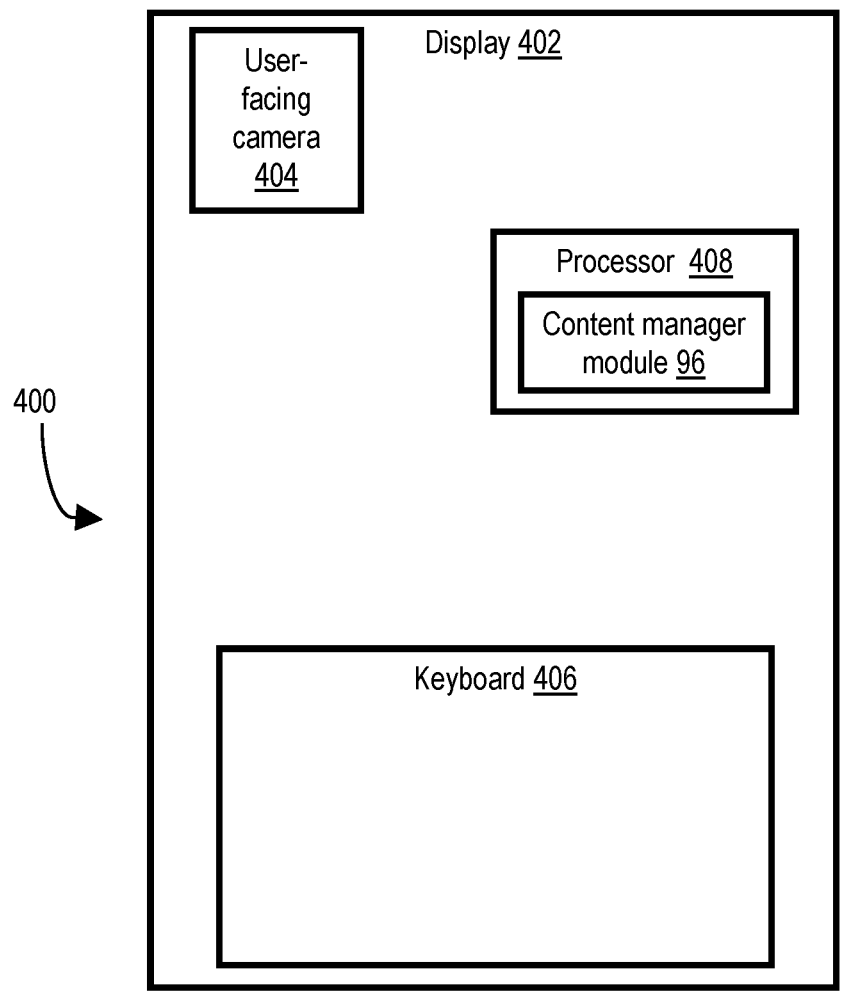
FIG. 4 depicts an exemplary user device configured to implement the content management module of FIG. 3.

For example, FIG. 4 depicts an exemplary user device 400 that is configured to implement the content management module 96. In one or more embodiments, the device 400 is for example a cellular phone or a tablet computer. The device 400 incorporates a display 402 (for presenting promoted or demoted content), a user-facing camera 404 (for eye tracking), a keyboard 406 (for monitoring typing behavior and typed content), and a processor 408 that is connected in communication with the display, the camera, and the keyboard and that is configured to implement the content manager module 96. Note that the user-facing camera 404 could be a front-facing camera that is built into the device 400, while the keyboard 406 could be implemented on a touch screen of the device 400 or as a separate device connected in communication with the device 400.

Referring again to FIG. 3, in one or more embodiments, the content management module 96 triggers a content demotion engine based on learning the user context and behavior from historical data, including the user's historic activity within his or her immediate social graph, shared data and retail/purchase footprint, activity within his or her extended graph (or forest), location, device-user interaction history, etc. In addition, in line with the "user-centric" world view, the content management module 96 also considers a cognitive state of the user.

At 314, cognitive state is inferred from, among other things, social media posts that the user has made within a time-window t, t-x days, where t denotes a given point-in-time and x denotes a 'learned' threshold. In some embodiments, the learned threshold is initially set to 7 (for a week long window). The learned threshold can be adjusted based on user feedback, as well as machine learning principles further discussed below.

In some embodiments, the cognitive state inference also includes the user's inner circle (social graph) and the posts made within that circle. For instance, if one of user A's close relatives (one hop away on a social graph) is sad, then that can potentially have an associated effect on user A's state as well. In some cases, the cognitive state inference also includes history of device-user interactions, etc.

In certain embodiments, the cognitive state is inferred as a normalized mean of the sentiment evaluated from each of the posts made in the past 7 day window. To include the impact of one's social circle, the normalized mean of the sentiment evaluated from posts made within the social circle (within the first hop) is determined and weighted down by a factor of x, where x is in the (0, 1) range. Intuitively, this translates to giving lower weight to someone else's emotions in a user's social graph (no matter how close) relative to the user's own emotions.

In one or more embodiments, at 316 the content management module 96 further enhances the user profile using some predicted attributes of the user behavior. By way of example, the predicted attributes of the user may comprise: predicting that a secondary user may attempt to purchase promoted and transferred content items without the knowledge and/or consent of the primary user; estimating the risk or inappropriateness of the promoted and transferred content items for the users; and the like. In some cases, the method of estimating the behavior of the users on one or more secondary devices includes analyzing the primary user context and activities that trigger the promotion of a new content item (which may be transferred to one or more secondary devices when the secondary devices are used by the secondary users), and comparing same to the context and activities of the secondary user or users.

For example, the content management module 96 determines the first user's preferences at 308 by developing a set of similar users with profiles similar to the first user and detecting responses of the set of similar users to a certain content. For developing the set of similar users, the system may perform clustering based on various attributes of the user that can be extracted from the user profile/context model (given the teachings herein, the skilled artisan will be able to apply suitable techniques to accomplish this goal). For instance, at the beginning, when the system is put in operation, the system can monitor profiles and determine relevant features to be used in clustering. In some embodiments, the features include—1) geography, 2) proximity within social graph (e.g., single hop), 3) asserted relationships (e.g., Mother, Father, Sister, Brother vs Second Cousin, etc.), 4) age group, etc. Once the system has enough data around profiles, it performs k means clustering to form similarity clusters based on similarities among profiles.

Once the clusters are formed, the system uses them during content demotion as follows: For a user A, in order to determine whether there should be a demotion trigger for a content item, the system first determines the similarity cluster of user A by computing its mean and finding a cluster with the closest mean. Other measures of central tendency can be used in place of the arithmetic mean. Generally, a "mean" of a user A is computed by first mapping and then normalizing the user's values of geography, social graph proximity, age group, etc. then applying a formula for measurement of central tendency. Next, the system inspects recent posts made within the similarity cluster of user A. If one of the posts refers to the content item in question and the corresponding user has explicitly disliked the content, then with a certain high-enough probability (e.g., >0.5), the system may trigger the content item demotion module for the user A. The probability in the previous step is computed using the number of dislikes expressed in the similarity cluster (the more the dislikes, the higher the probability). For example, the probability may be computed as a ratio of the number of dislikes to the total number of posts in the similarity cluster that discuss the content. The probability may further be weighted to account for apathy, i.e. users who do not dislike the content but who do not like it sufficiently to post about it.

In one or more embodiments, at 308 the content management module 96 builds or updates the user preferences from detected user actions (e.g., a user tries to hide a piece of promoted content or part of it) based on monitored user interactions with the content items, applications, the device and so on. Additionally, in one or more embodiments at 309 the content management module 96 prompts the user with a feedback box asking whether the user's action was caused by a time-sensitive event. If answered yes, the content management module 96 analyzes the user's historic social media data to understand contextual clues for content demotion in posts within $\{t, t-x\}$ time window during cognitive state inference. Then, at 311 the content management module 96 re-trains the model used to infer the cognitive state (i.e. re-calculates the weights in the model) and/or adjusts the value of x (from the initialized value of 7 days). Thus, the content management module 96 learns by analyzing user feedback (e.g., "I don't like this Ad", "Don't show it to me again") and user actions (e.g., historic likes/dislikes, analysis of facial expressions).

In one or more embodiments, at 308 the content management module 96 builds user preferences based, in part, on a user's election to be considered as a member of a cohort of users and the system may estimate user preferences based on votes, actions, or behaviors of members of that cohort. Generally, this operates in the same way as estimating the user's preferences based on the actions or behaviors of similar users, except that instead of the system using k-means clustering to identify the similar users, the user herself or himself identifies with a cohort. In other embodiments, the content management module 96 automatically estimates that a user is a member of a cohort based on the user's history of dealing with promoted content (e.g., using k-means clustering on history of actions). Then, the system may use active learning by processing the input of other members of user's cohort through time.

In one or more embodiments, at 322 the content management module 96 estimates content demotion factors, including determining a temporal aspect of content to be demoted, based on a risk R associated with the user context and behavior. An example of "temporal aspect" of demotion may include demotion of content item for a short duration of time T (where T may be the expected duration of a user's current cognitive state, e.g., "the user will be sad for the next approximately T time period."), demotion of content for a longer duration of time D (where D is computed based on a specified or learned user context such as age-limit or time of the day), or permanent demotion of content item or the like (e.g., a user with chronic emotional or behavioral disturbance related to the content). Exemplary risks R include behavioral risk, health risk, monetary risk, etc.

Thus, at 322 content demotion is implemented consistent with the user preferences established in preceding steps. In one or more embodiments, content demotion includes (temporarily or permanently) removing or deleting, hiding, changing, replacing or morphing a video, audio, text or picture content item (e.g., an ad, news article, post, comment) from an application (e.g., social media, streaming media, e-commerce, e-mail) or a device, blocking transfer from a primary device to a secondary device of promoted content along with application and user states, etc.

In one or more embodiments, multi-mode content demotion is implemented. Based on an analysis of user history, cognitive state inference and user preferences (all described above), once the content management module 96 predicts with a certain confidence level C that certain content will be objectionable, the content management module 96 obscures or demotes the content. In one or more embodiments, the content management module 96 obscures or demotes the content to a degree that is a function of (e.g., proportional to, but could also be non-linear) the confidence level (instead of removing the content altogether). For example, if the particular content (text content, images, animations, or sounds) is likely to be unwelcome to a user, then the system may partially obscure the content based on the value of C. If the value of C is very high, none of the content in question will be seen or heard. If C is intermediate, a dimmer version of the content will be seen. Degree of obscuration may include: bars with spaces between the bars, masks with holes in them, changes in image size or intensity, changes in font size or color or darkness of the font, addition of noise or frequency distortion of audio, etc. Also, in one or more embodiments a user can reduce the level of obscuration in a gradual manner, thus reducing the likelihood that he or she will suddenly be exposed to an objectionable image, page, piece of text, post, etc.

In one or more embodiments, obscuration style and degree of obscuration (demotion mode) are set or specified in a user profile. In one or more embodiments, the obscuration style and degree of obscuration are learned through time based on the user's use of the system, by analyzing historical user feedback provided for past obscuration styles or by the votes of users in a similarly clustered or self-identified cohort. A suggested obscuration style and degree may be set or recommended by a third party, such as a caregiver, employer, etc. In one or more embodiments, the content management module 96 learns when to change an obscuration style or amount based on a user's evolving use of a system and evolving exposure to certain content. In one or more embodiments, the manner in which content is obscured varies depending on the device being employed. For example, one form of obscuration may be desirable or useful on a smartphone, and another form of obscuration may be desirable or useful on a large LCD display.

In one or more embodiments, the content management module 96 learns through implementation of a neural network that is supervised by logging a user's interactions with promoted and demoted content. Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons.

A neural network can implement supervised, unsupervised, or semi-supervised machine learning.

Figure 5:
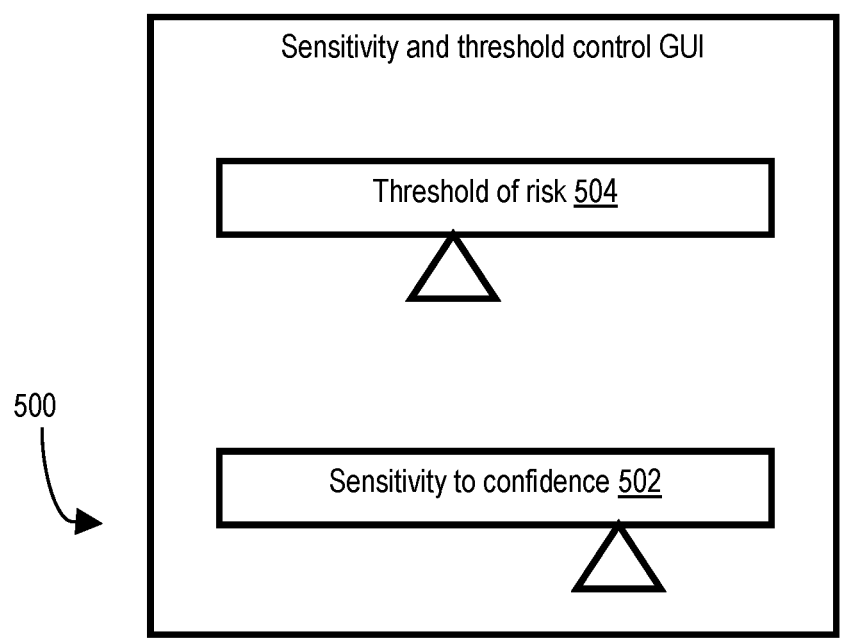
FIG. 5 depicts an exemplary graphical user interface control for use with the content management module.

In one or more embodiments, a graphical user interface (GUI) element (e.g., slider) is provided for a primary user to control the degree of obfuscation and the sensitivity of this degree to the value of C. FIG. 5 depicts an exemplary GUI control 500 that includes a slider 502 for adjusting sensitivity to C and a slider 504 for adjusting a threshold value of a risk of offense R. Other controls, such as a dial (rotary slider) could be implemented. One example of user interface that could be employed in some cases is hypertext markup language (HTML) code served out by a server or the like, to a browser of a computing device of a user. The HTML is parsed by the browser on the user's computing device to create the graphical user interface (GUI). In one or more embodiments, the content management module 96 learns user preferences from user manipulation of the GUI control 500.

In one or more embodiments (e.g., for users who have given permission by opting in or the like), the content management module 96 reports to advertisers which promoted content is being demoted so that the promoter (either a trained computer system or manual content promoter) of content can learn that viewers find the content objectionable. This is actually useful for advertisers to know, so that they can modify their content and reach more people and please more people.

In further embodiments, the system is configured as a trans-vendor service with various applications, user devices or communication devices and runs in the background with content advertisement systems. The various applications may include e-commerce applications (e.g., Amazon), messaging applications (e.g., WhatsApp, Facebook Messenger, WeChat, Skype, Viber, Telegram, Snapchat, SMS, etc.), social media applications (e.g., Facebook, LinkedIn), email systems, and so on. The various components of the system monitor the user interactions with one or more such applications (including social media posting, group posting such as in a WhatsApp group), user devices or communication devices. These components analyze, detect or predict the aspects of the content promotion or demotion factors for a user or group of users, detect or predict the cognitive properties, emotional level, measure content item appropriateness, and so on. In one or more embodiments, the configuration of the system is based on specific subscription requirements, including a privacy model and service level agreements. Alternatively, the system can be available as a browser plug-in.

In one or more embodiments, the content management module 96 improves the operation of a cloud network computer system by improving the user experience of the cloud network. For example, the content management module 96 demotes promoted content that is assessed by the content management module, with a given level of confidence, as presenting a given risk of being potentially objectionable to the user. Demotion of promoted content alters the user experience by restoring a balance of power in the content delivery paradigm in favor of the user's tastes, preferences, and condition. Furthermore, one or more embodiments solve a problem that is unique to computer networks; namely, promoted content that is suitable for a user having multiple computing devices, wherein the user has a primary device and one or more secondary devices, and wherein the promoted content is unsuitable for one or more secondary users who might be inappropriately exposed to the promoted content on the secondary device(s). This problem can be solved by demoting the promoted content, i.e. blocking transfer of the promoted content from the primary device to the secondary device(s).

It is worth noting that unlike some prior art approaches targeted to a user's "search query results," one or more embodiments focus on partially demoting promoted content items such as video, audio, or text for a user(s) from one or more applications (e.g., social media, content sharing application, e-commerce applications). Moreover, one or more embodiments include one or more rule-based systems, the rule based system accessing one or more attributes (e.g., historical interaction classified by devices, patterns classified by time of day, demographic information, behaviors and mood patterns, current geographic and location context, etc.) of the user profile to determine a demotion control signal that depends on one or more conditions (e.g., analysis of risk score associated with the promoted content specific to the user state, and whether the risk is temporary or permanent in nature, etc.). This demotion control can, for example, control: time of access, user access/restriction, blocking, levels of blocking (medium, low, high obfuscation levels), storage in a category, etc. One or more embodiments include one or more output devices that display content, the output devices having one or more control points, wherein the demotion control signal is applied to the control point to demote display of content. One or more embodiments provide various fine-granular demotion actions, that is, the demotion of a content item may include temporarily or permanently removing, hiding, deleting, changing, replacing or morphing of video/audio/text/picture content item (of an ad, news article, post, comment, tweet, etc.) from applications (e.g., YouTube, Facebook, twitter, e-commerce application) and devices, etc. One or more embodiments provide a method for estimating the content demotion factors, comprising: (i) determining temporal aspect(s) of the content (to be demoted) based on the user context and behavior (e.g., expected duration of the user cognitive state to last, e.g., "the user will be sad approximately for the next T time period", specified or learned user context such as age-limit or time of the day, user with anxiety or autism with respect to the promoted content item or the same category, etc.); (ii) analyzing risk R (e.g., behavioral risk, cultural risk, health risk, monetary risk, etc.) associated with the received promoted content item; (iii) determining the content demotion is partial or complete based on the characteristics of the promoted content item; (iv) triggering the demotion process based on determined temporal aspect and computed risk R value, i.e. causing the content to be demoted for a period of time based on the temporal aspect in response to the computed risk R exceeding a threshold value.

Indeed, one or more embodiments advantageously employ various greedy and machine learning algorithms for partial demotion of promoted content items. More specifically, one or more embodiments provide a method and system comprising receiving promoted content item(s) (e.g., video, audio, or text) for a user(s) from one or more applications (e.g., social media, content sharing application, e-commerce applications); defining and quantifying context, preferences and feedback from a user centric view; predicting the user(s) behavior with respect to the received promoted content item; determining content item demotion factors for the received promoted content item; and, based on the predicted user context, user behavior, and demotion factors, automatically demoting the content item. The system predicts, with a certain confidence level C, that certain content will not be welcome (or will be objectionable), and then the system optionally obscures the content to a degree based on the confidence level. In addition, unlike prior art techniques, one or more embodiments do not ignore the aspects of contexts related to the first device and the first user of the first device, as well as the context of the secondary users of the secondary devices (e.g., a shared mobile phone by family members of different context and behavior such as adult vs. children, or a computing device shared by co-workers with different culturally sensitiveness); one or more embodiments recognize that, while displaying the promoted content item might be suitable for the first user of the first device, it might not be suitable for all, or subset of, the other secondary users of the secondary devices. In another embodiment, the system triggers the content demotion engine by learning the user context and behavior from plurality of historical data, including historic user's activity within her or his immediate social graph, shared data and retail/purchase footprint, activity within his or her extended graph (or forest), location, device-user interaction history, etc. In one or more embodiments, the partial demotion process is also triggered based on the cognitive state of the user that is inferred from the posts that the user has made within a time-window t, t-x days, where t denotes a given point-in-time and x denotes a 'learned' threshold.

One or more embodiments provide a system for partial demotion of promoted content, comprising:

(i) one or more rule based systems, the rule based systems accessing one or more attributes (e.g., historical interaction classified by devices, patterns classified by time of day, demographic info, behaviors and mood patterns, current geographic and location context, etc.) of the user profile to determine a demotion control signal that depends on one or more conditions (e.g., analysis of risk score associated with the promoted content specific to the user state, and whether the risk is temporary or permanent in nature, etc.). This demotion control can control: time of access, user access/restriction, blocking, levels of blocking (medium, low, high obfuscation levels), storage in a category, etc.);

(ii) one or more output devices that display content, the output devices having one or more control points, wherein the demotion control signal is applied to the control point to demote display of content;

(iii) demotion of content item(s) may include temporarily or permanently removing, hiding, deleting, changing, replacing or morphing of video/audio/text/picture content item (of an ad, news article, post, comment, tweet, etc.) from applications (e.g., YouTube, Facebook, twitter, e-commerce application) and devices, etc.

Given the discussion thus far, it will be appreciated that, in general terms, an exemplary method, according to an aspect of the invention, includes 302 receiving promoted content for display at a primary device (cellular or mobile phone is a non-limiting example; device can be, for example, a node in a cloud network); 308 predicting a user's behavior with respect to the promoted content by estimating the user's context and preferences, using a neural network; and in response to the prediction of the user's behavior, 322 automatically demoting the promoted content. The neural network can run in the primary device and/or on the cloud (depending, e.g., on the capability of the primary device). Demotion can advantageously be carried out at the primary device level; however, it can be demoted at the content in the cloud network, in other embodiments.

In one or more embodiments, predicting the user's behavior includes 304 detecting and profiling a primary user on the primary device and 306 detecting and profiling secondary users on secondary devices by monitoring the users' interactions with the devices and with one or more applications.

In one or more embodiments, demoting the promoted content includes at least one of temporarily or permanently removing, hiding, deleting, changing, replacing or morphing video, audio, text, or image components of the promoted content.

In one or more embodiments, estimating the user's context and preferences includes monitoring the user's interactions with the primary device and monitoring the user's interactions with one or more applications facilitated by the primary device.

In one or more embodiments, monitoring the user's interactions with the one or more applications includes at least one of eye tracking, motion tracking, audio or speech detection, e.g., using a camera of the primary device. In one or more embodiments, monitoring the user's interactions with the primary device includes monitoring at least one of typing speed, typing sequence, typing pattern, and mouse movement, e.g., using a touchscreen of the primary device.

In one or more embodiments, estimating the user's context includes 314 inferring the user's cognitive state from social media posts made by the user or by members of the user's social graph within a predetermined number of days preceding the present day.

In one or more embodiments, inferring the user's cognitive state includes 309 obtaining user feedback on promoted content, and 311 re-training a neural network model of the user's cognitive state in response to the user feedback.

In one or more embodiments, demoting the promoted content includes estimating content demotion factors that include a temporal aspect of the content to be demoted and a risk associated with a relationship of the user to the promoted content.

In one or more embodiments, demoting the promoted content includes estimating a confidence level C that the promoted content will be objectionable to the user, then obscuring the promoted content to a degree that is a function of the confidence level C.

In one or more embodiments, demoting the promoted content includes blocking transfer of the promoted content from the primary device to one or more secondary devices. In one or more embodiments, blocking the transfer of the promoted content is based on detecting and profiling secondary users of the secondary devices.

Figure 6:
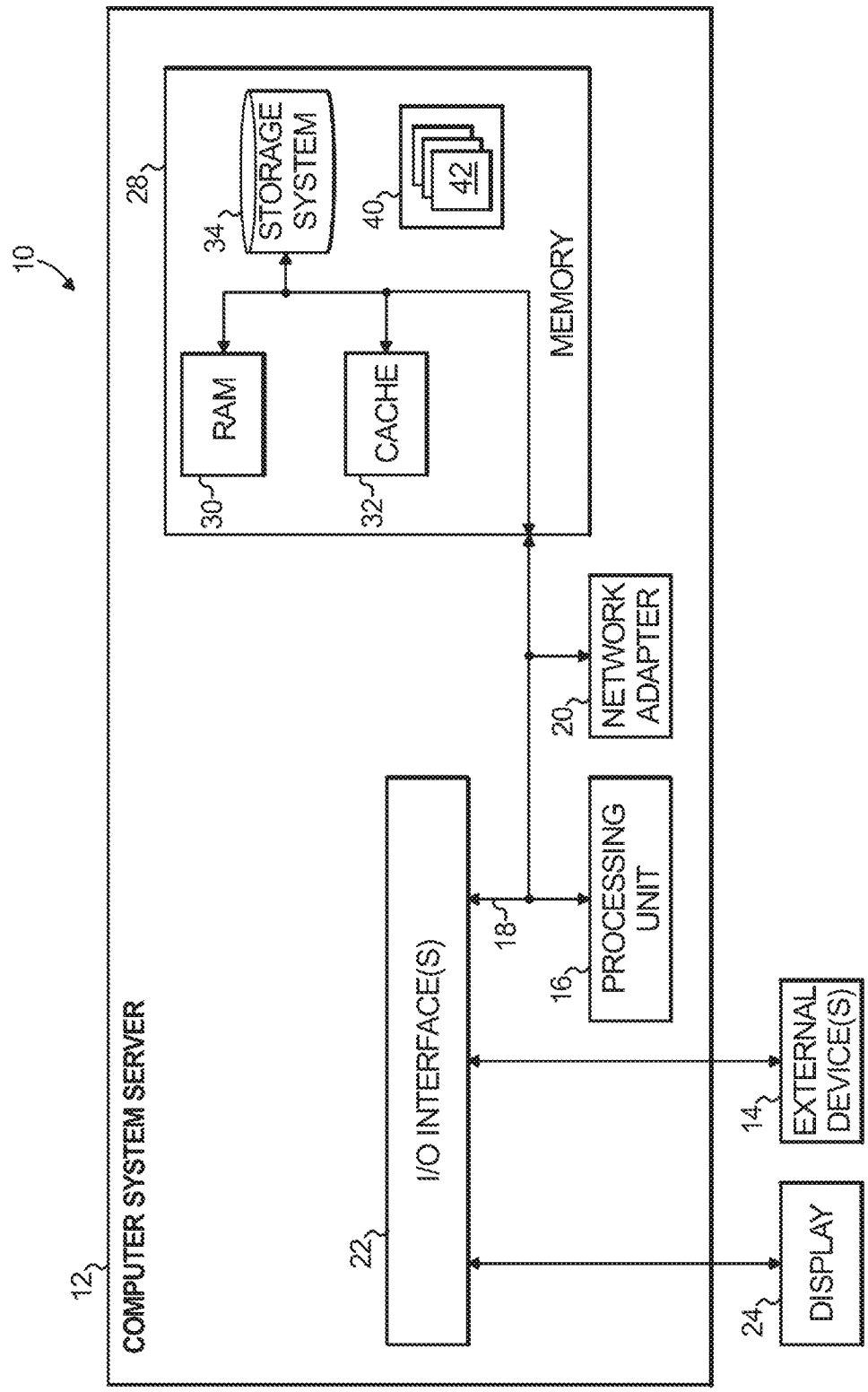
FIG. 6 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps. FIG. 6 depicts a computer system that may be useful in implementing one or more aspects and/or elements of the invention, also representative of a cloud computing node according to an embodiment of the present invention. Referring now to FIG. 6, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 6, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 6) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving promoted content for display at a primary device that is a node of a cloud network and a user device;
detecting and profiling a user's cognitive state by monitoring the user's interactions with the primary device using at least one of: eye tracking sensors, motion tracking sensors, audio/speech sensors, and a camera and monitoring the user's interactions with one or more applications using at least one of: typing characteristics, mouse movement, analysis of typed content, and an application profile;

predicting the user's behavior with respect to the promoted content by inferring the user's context and preferences from the detected profile of the user's cognitive state, using a neural network;
prompting the user for feedback via the primary device;
retraining the neural network using the feedback; and
in response to the prediction of the user's behavior that the user may attempt to purchase promoted content, automatically demoting the promoted content, wherein demoting the promoted content includes blocking transfer of the promoted content that is displayed at the primary device from the primary device to one or more secondary devices via a peer-to-peer network that is established between the primary device and the one or more secondary devices.

2. The method of claim 1, wherein predicting the user's behavior includes detecting and profiling a primary user on the primary device and detecting and profiling secondary users on secondary devices.

3. The method of claim 1, wherein demoting the promoted content includes at least one of temporarily or permanently removing, hiding, deleting, changing, replacing or morphing video, audio, text, or image components of the promoted content.

4. The method of claim 1, wherein inferring the user's context includes inferring the user's context from social media posts made by the user or by members of the user's social graph within a predetermined number of days preceding the present day.

5. The method of claim 4, wherein inferring the user's cognitive state includes obtaining user feedback on promoted content, and re-training a neural network model of the user's cognitive state in response to the user feedback.

6. The method of claim 1, wherein demoting the promoted content includes estimating content demotion factors that include a temporal aspect of the content to be demoted and a risk associated with a relationship of the user to the promoted content.

7. The method of claim 1, wherein demoting the promoted content includes estimating a confidence level C that the promoted content will be objectionable to the user, then obscuring the promoted content to a degree that is a function of the confidence level C.

8. The method of claim 1, wherein demoting the promoted content includes demoting the promoted content at the primary device.

9. A non-transitory computer readable medium embodying computer executable instructions which when executed by a computer cause the computer to facilitate the method of:
receiving promoted content for display at a primary device that is a user device: detecting and profiling a user's cognitive state by monitoring the user's interactions with the primary device using at least one of: eye tracking sensors, motion tracking sensors, audio/speech sensors, and a camera and monitoring the users interactions with one or more applications using at least one of: typing characteristics, mouse movement, analysis of typed content, and an application profile;
predicting the user's behavior with respect to the promoted content by inferring the user's context and preferences from the detected profile of the user's cognitive state, using a neural network;
prompting the user for feedback via the primary device: retraining the neural network using the feedback; and
in response to the prediction of the user's behavior that the user may attempt to purchase promoted content, automatically demoting the promoted content, wherein demoting the promoted content includes blocking transfer of the promoted content that is displayed at the primary device from the primary device to one or more secondary devices via a peer-to-peer network that is established by the primary device with the one or more secondary devices.

10. The computer readable medium of claim 9, wherein predicting the user's behavior includes detecting and profiling a primary user on the primary device and detecting and profiling secondary users on secondary devices.

11. The computer readable medium of claim 9, wherein inferring the user's context includes inferring the user's context from social media posts made by the user or by members of the user's social graph within a predetermined number of days preceding the present day.

12. The computer readable medium of claim 11, wherein inferring the user's cognitive state includes obtaining user feedback on promoted content, and re-training a neural network model of the user's cognitive state in response to the user feedback.

13. An apparatus comprising:
a memory embodying computer executable instructions; and at least one processor, coupled to the memory, and operative by the computer executable instructions to facilitate a method of:
receiving promoted content for display at a primary device that is a user device: detecting and profiling a user's cognitive state by monitoring the user's interactions with the primary device using at least one of: eye tracking sensors, motion tracking sensors, audio/speech sensors, and a camera and monitoring the user's interactions with one or more applications using at least one of: typing characteristics, mouse movement, analysis of typed content, and an application profile;
predicting the user's behavior with respect to the promoted content by inferring the user's context and preferences from the detected profile of the user's cognitive state, using a neural network;
prompting the user for feedback via the primary device: retraining the neural network using the feedback; and
in response to the prediction of the user's behavior that the user may attempt to purchase promoted content, automatically demoting the promoted content, wherein demoting the promoted content includes blocking transfer of the promoted content that is displayed at the primary device from the primary device to one or more secondary devices via a peer-to-peer network that is established by the primary device with the one or more secondary devices.

14. The apparatus of claim 13, wherein predicting the user's behavior includes detecting and profiling a primary user on the primary device and detecting and profiling secondary users on secondary devices.

* * * * *